US012036733B2

(12) United States Patent
Sehrt

(10) Patent No.: US 12,036,733 B2
(45) Date of Patent: Jul. 16, 2024

(54) METHOD AND DEVICE FOR ADDITIVE LAYER MANUFACTURING OF AT LEAST ONE COMPONENT

(71) Applicant: Ruhr-Universitaet Bochum, Bochum (DE)

(72) Inventor: Jan T. Sehrt, Muelheim (DE)

(73) Assignee: RUHR-UNIVERSITAET BOCHUM, Bochum (DE)

( * ) Notice: Subject to any disclaimer, the term of this patent is extended or adjusted under 35 U.S.C. 154(b) by 73 days.

(21) Appl. No.: 17/702,602

(22) Filed: Mar. 23, 2022

(65) Prior Publication Data

US 2022/0314532 A1    Oct. 6, 2022

(51) Int. Cl.
| B29C 64/153 | (2017.01) |
| B29C 64/188 | (2017.01) |
| B29C 64/214 | (2017.01) |
| B29C 64/232 | (2017.01) |
| B29C 64/241 | (2017.01) |
| B29C 64/245 | (2017.01) |
| B29C 64/255 | (2017.01) |
| B29C 64/268 | (2017.01) |
| B29C 64/35  | (2017.01) |

(Continued)

(52) U.S. Cl.
CPC .......... *B29C 64/153* (2017.08); *B29C 64/188* (2017.08); *B29C 64/214* (2017.08); *B29C 64/232* (2017.08); *B29C 64/241* (2017.08); *B29C 64/245* (2017.08); *B29C 64/255* (2017.08); *B29C 64/268* (2017.08); *B29C 64/35* (2017.08); *B33Y 10/00* (2014.12); *B33Y 30/00* (2014.12); *B33Y 40/20* (2020.01)

(58) Field of Classification Search
CPC ... B29C 64/153; B29C 64/188; B29C 64/214; B29C 64/232; B29C 64/241; B29C 64/245; B29C 64/255; B29C 64/268; B29C 64/35; B33Y 10/00; B33Y 30/00; B33Y 40/20; B22F 12/67; B22F 10/28; B22F 12/37
See application file for complete search history.

(56) References Cited

U.S. PATENT DOCUMENTS

| 8,172,562 B2 | 5/2012 | Mattes |
| 10,722,944 B2 | 7/2020 | Wienberg |

(Continued)

FOREIGN PATENT DOCUMENTS

| DE | 102 35 434 A1 | 2/2004 |
| DE | 10 2014 004 633 A1 | 10/2015 |

(Continued)

*Primary Examiner* — Michael M. Robinson
(74) *Attorney, Agent, or Firm* — Norris McLaughlin, P.A.

(57) ABSTRACT

In a device and a method for additive layer manufacturing of at least one component, in a multiply recurring manner, a powder bed layer made of a fusible powder material is generated above a build platform of a build container, and the powder material of the powder bed layer, for producing a layer of the component, is fused by way of an energy beam in a cross-sectional surface representing the component in the layer to be produced, wherein the powder material bonds to itself and to layers present beneath the layer to be produced, and the build platform is lowered in the build container after each layer that is manufactured, wherein the partially created component is moved multiple times, in a direction different from the lowering direction.

14 Claims, 2 Drawing Sheets

Figure 1:
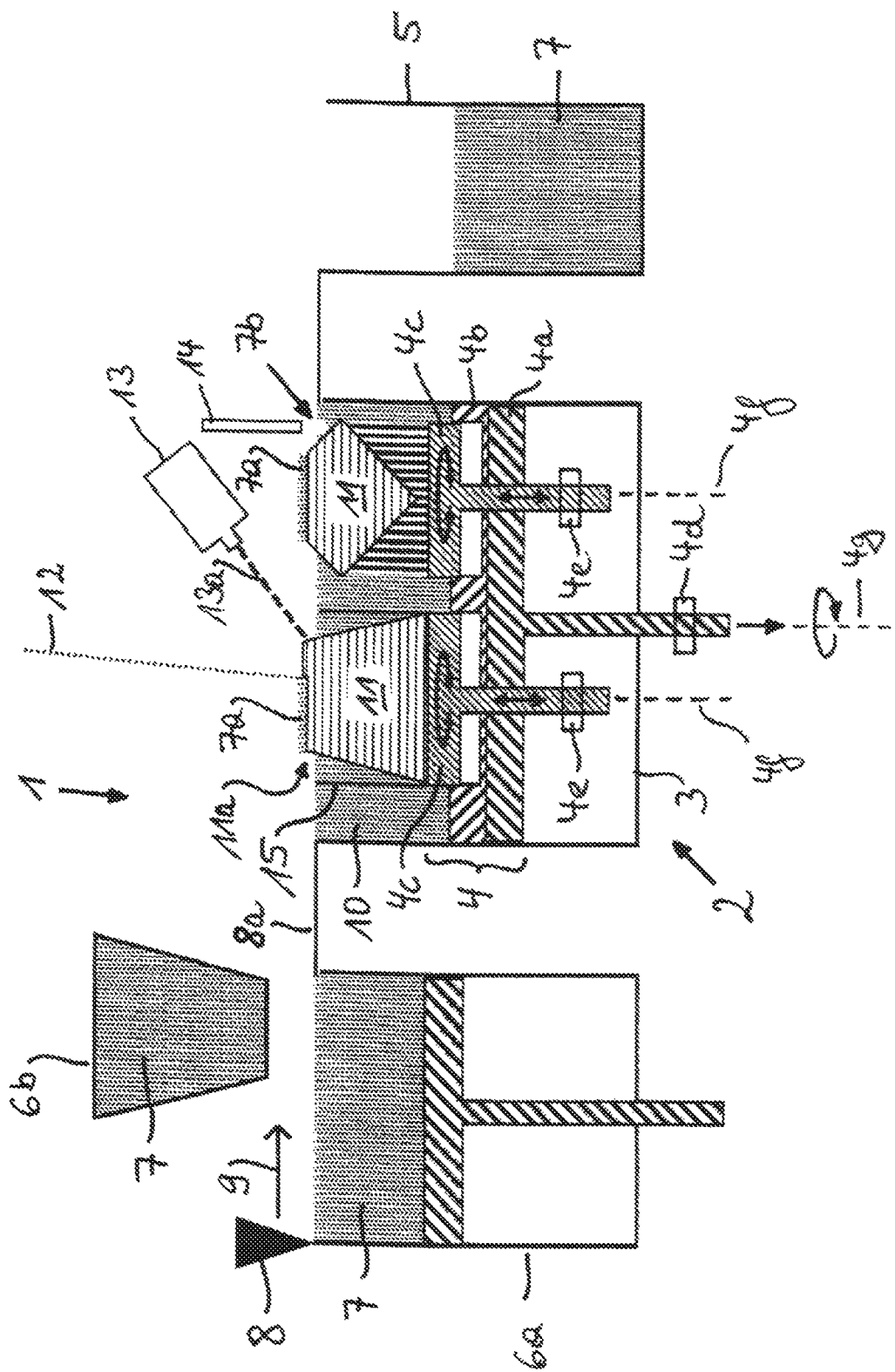

(51) Int. Cl.
*B33Y 10/00* (2015.01)
*B33Y 30/00* (2015.01)
*B33Y 40/20* (2020.01)

(56) References Cited

U.S. PATENT DOCUMENTS

| | | |
|---|---|---|
| 11,253,922 B2 | 2/2022 | Holford et al. |
| 2017/0252806 A1* | 9/2017 | Wienberg .............. B33Y 50/02 |
| 2018/0345373 A1* | 12/2018 | Holford ................. B33Y 80/00 |
| 2019/0099809 A1* | 4/2019 | Hellestam ............. B29C 64/245 |
| 2019/0381605 A1* | 12/2019 | Madelone, Jr. ......... B22F 12/45 |
| 2020/0189037 A1 | 6/2020 | Lu et al. |
| 2021/0252803 A1* | 8/2021 | Bucknell ................. B22F 12/84 |
| 2022/0088869 A1* | 3/2022 | Coon .................... B33Y 30/00 |

FOREIGN PATENT DOCUMENTS

| | | |
|---|---|---|
| DE | 10 2016 203 582 A1 | 9/2017 |
| DE | 10 2016 211 800 A1 | 1/2018 |
| DE | 10 2018 112 383 A1 | 12/2018 |

\* cited by examiner

METHOD AND DEVICE FOR ADDITIVE LAYER MANUFACTURING OF AT LEAST ONE COMPONENT

The invention relates to a method for additive layer manufacturing of at least one component in which, in a multiply recurring manner, a powder bed layer made of a fusible powder material is generated above a build platform of a build container, and the powder material of the powder bed layer, for producing a layer of the component, is fused by way of an energy beam, in a cross-sectional surface representing the component in the layer to be produced. Furthermore, in this method, the build platform is lowered in the build container, in particular after producing each layer, and in particular by a magnitude that corresponds to the height of a created powder bed layer.

It is, in particular, provided in this method that, during melting, the powder material bonds to itself and to layers present beneath the layer to be produced. In this way, overall, a component can result that, upon completion of the manufacturing process, is formed of a plurality of bonded layers. Such a method is often simply referred to as powder bed-based 3D printing. Likewise, instead of additive manufacturing, the term 'generative manufacturing' is also used.

In this method, as known heretofore in the prior art, each individual layer of the component is always produced at the same manufacturing level. This manufacturing level corresponds to the application level of the powder bed, which is to say, the region in which the powder bed layer is applied above or on top of the build platform.

In the known prior art, and also in the invention, the generated powder bed layer only covers the build platform at the beginning of the process. After a first layer and all other layers of a component have been produced, the powder bed layer, after having been applied, also covers all preceding powder bed layers on top of/above the build platform, and the component that has been partially created up to this point in time. In these cases, the partially created component is disposed on top of the build platform, which is lowered in a layer-by-layer fashion, and is surrounded by the powder material in the powder bed of all previously applied powder bed layers, which is to say, is embedded therein.

The term component shall, generally speaking, be understood to mean a geometric construct that is the result of the manufacturing method. If the manufacturing method has not yet been completed, this description uses the term 'partially created component.' The manufactured component may be a component that is to be used, directly. Frequently, however, the manufactured component does not directly correspond to the component to be used. For example, the manufactured component may be post-treated, so as to obtain a component to be used. This is necessary, for example, when the manufactured component includes auxiliary structures that are necessary for carrying out the method, which must be removed to obtain the component to be used. Other treatment steps may also be provided, such as, for example, post-processing of the surface of the manufactured component.

It is also known in the prior art to manufacture multiple components simultaneously, when carrying out the method. The invention may also make use of this.

For carrying out such a method, it is known to employ a device for additive layer manufacturing of at least one component which comprises a build container including a build platform, which can be lowered, and preferably lowered incrementally, in the build container. The build container surrounds the entire powder bed with the lowerable build platform thereof in all phases of the method, and is open toward the top for applying or creating powder bed layers.

The device furthermore comprises a powder reservoir including an application device, wherein a powder bed can be generated, layer by layer, from the powder of a powder reservoir, in the build container on top of/above the build platform, using the application device.

The application device can preferably be formed by an application doctor blade, which pushes powder in a preferably linear, reciprocating application motion, and across the build container and the build platform thereof, as well as possibly across an existing powder bed and the partially created component embedded therein. After passing over the build container, excess powder can be collected in a collection container next to the build container, for further use.

The working height of the application doctor blade during the movement thereof is always the same. The lower edge of the application doctor blade thus moves in a plane that is always the same. The height of the lower edge of the application doctor blade thus determines the height of the respective created powder bed layer above the build platform, or above the existing powder bed and the partially created component. As a result, the powder bed layer is always applied at the same application level, which is to say, in particular, between the upper plane of the preceding powder bed layer and the lower edge of the application doctor blade. The height of the powder bed layer results from the magnitude by which the build platform is lowered before the next/new powder bed layer is created. This is also provided for in the invention.

The device furthermore comprises at least one radiation source for generating an energy beam, wherein the powder of the powder bed or of the created powder bed layer can be locally fused in the build container by way of the energy beam. For this purpose, the generated energy beam is guided across the powder bed layer in a controlled manner based on control data, which, layer by layer, represents the component to be manufactured. The melting occurs at the respective impingement site. In this way, the powder is fused in the layer to be produced at the locations that are situated in the cross-sectional surface of the component in the layer to be produced.

It is preferably provided to utilize a laser as the beam generating source, so that the energy beam is formed by the laser beam that is generated and directed at the powder bed layer. It is likewise possible to use an electron beam, which is generated by an electron source. In such a case, the method is carried out under pressure conditions below the surrounding atmospheric pressure, which is to say, in particular, under vacuum.

The invention can preferably use a metal powder or a plastic powder or a ceramic powder as the powder material. The powder bed-based fusion method carried out therewith according to the invention is preferably, as defined in DIN EN ISO/ASTM 52900, powder bed fusion (PBF), by means of laser beams (LB), of metals (M)—PBF-LB/M— or of plastic materials, which is to say, polymers (P)—PBF-LB/P— or by means of electron beam (EB)—PBF-EB/M.

The existing methods have problems in that, after the powder of the generated powder bed layer has been fused, which heretofore has taken place at the application level of the powder bed layer, powder residues from the surrounding powder bed may still adhere to the fused powder. This results in high surface roughness, as well as in dimensional inaccuracy of the manufactured component.

Furthermore, excess contour elevations can arise in the edge regions of the contours/cross-sectional surfaces that have been exposed to light, at the transition to the powder bed, in particular due to uneven temperature conditions between the partially created component and the surrounding powder bed, which usually has a lower thermal conductivity than the component regions that are fused together.

Due to the lower thermal conductivity of the powder, the melt bath is maintained for a longer period in the regions of transition to the powder bed, and can take up loose powder, which can cause a volume increase close to the edge and, consequently, cause the aforementioned contour elevation. It is also possible for such contour elevations to arise in a manner conflicting with the movement direction of an application doctor blade, and to thereby impede the doctor blade passing over the partially created component, even though the partially created component was previously lowered before a new powder bed layer was applied. A contour elevation may be so high that the application doctor blade can collide therewith, which can result in damage to the component and the device, and can result in the process being terminated.

It is therefore the object of the invention to improve a method and a device of the type mentioned at the outset in such a way that the aforementioned problems are at least reduced, and preferably eliminated.

In the method, this object is achieved by moving the partially created component, in particular multiple times, in a direction different from the lowering direction.

In the device, the object is achieved by the device comprising a unit by way of which a component that has been partially created in the powder bed can be moved in a direction different from the lowering direction, which, in particular, is designed to carry out a movement having a direction different from the lowering direction while the method is being carried out.

Preferably, the process is such that the partially created component is moved relative to the surrounding powder bed, as a result of the movement according to the invention, or is at least repositioned, in a direction different from a vertical direction, relative to components of the device outside the build container, and in particular relative to the application doctor blade.

Such a movement of the partially created component by way of a unit of the device can, for example, be provided chronologically before a new powder bed layer is created, in particular so as to prevent collisions between the partially created component and an application doctor blade, or to reduce the impact thereof, or chronologically after the powder bed layer has been created, preferably before the energy beam follows along the cross-sectional surface to be fused, in particular so as to enhance the fusion quality. The movement can also be provided so as to carry out a post-treatment of the partially created component after a fusion process, even though the component has not yet been completely removed from the powder bed.

It is essential for the invention that the unit allows for movement directions that do not correspond to the downwardly directed lowering direction of the build platform. In particular, movements that have not been allowed for by existing devices during operation may thus be carried out according to the invention.

In a preferred embodiment, the invention can provide that the partially created component is rotated about an axis that is parallel to the lowering direction, and in particular about a vertical axis. Such a movement can, in particular, be provided after the fusion process of a layer of the component by way of the energy beam has taken place, and before a new powder bed layer is created. The movement can be carried out before, or after, or during the lowering movement of the build platform that is provided before the new powder bed layer is created.

The invention can provide that, in one possible embodiment, this rotational movement is carried out by way of the build platform itself, which also carries out the lowering movement. For this purpose, the build platform is preferably a plate that is circular in the horizontal cross-section and that is rotatably mounted in the build container, in addition to being lowerable.

As an alternative, the overall build container can also be rotated, independently of the horizontal cross-section thereof, or independently of the horizontal cross-section of the build platform, which, however, is likewise preferably circular. The build platform or the entire build container can preferably be made to carry out a rotational movement by way of a drive, in particular by way of a motor, preferably by way of a stepper motor, wherein the rotational movement, in particular, ends before a powder bed layer is applied or a layer is produced by powder fusion.

Thus, in this embodiment, the device according to the invention is formed by the entire build container or the entire build platform, which comprises a drive, by way of which the overall build platform can be rotated about an axis of rotation that is parallel to the lowering direction.

In this case, the partially created component can rotate together with the powder bed situated on the build platform, in particular relative to the build container wall, or together therewith, but in particular, at least relative to components of the device outside the build container, such as the application doctor blade.

Another possible preferred embodiment of the device can also provide that the unit for generating the movement according to the invention comprises at least one component carrier, which is disposed at/in a component carrier receptacle of the build platform and can be moved relative thereto.

The invention can then provide that at least one component is produced on, above, or on top of such a component carrier, but not, however, above the regions of the build platform or of the component carrier receptacle surrounding the one such component carrier. In this way, relative mobility of a partially created component is possible, with respect to the build platform that can be lowered during the manufacturing process, and in particular that can only be lowered, at least with respect to the component carrier receptacle thereof.

So as to bring about rotation of the partially created component when the method is carried out, it may preferably be provided that the component carrier can be rotated relative to the component carrier receptacle of the build platform about an axis of rotation that is parallel to the lowering direction, and in particular a vertical axis of rotation. For example, the component carrier can be attached in a rotatable mounting at, or in, the component carrier receptacle of the build platform, and can be rotated relative to the component carrier receptacle of the build platform by way of a drive, for example a motor, and preferably a stepper motor. In this embodiment, the component carrier receptacle itself preferably cannot be rotated, but can only be lowered.

In this embodiment, or in embodiments described hereafter, the component carrier is preferably designed as a plate having a circular horizonal cross-section, which is inserted so as to be rotatable in a recess of the component carrier receptacle of the build platform.

According to the method, it can be provided that at least one component is produced on a component carrier of the build platform, and that the partially created component is rotated by way of the component carrier about an axis that is parallel to the lowering direction, in particular a vertical axis, relative to the component carrier receptacle of the build platform, in particular multiple times during the overall production of a component.

With a build platform design of this sort, comprising a component carrier receptacle and at least one component carrier disposed therein/thereon, it may preferably also be provided that the component carrier can be linearly moved, in particular in a reciprocating manner, relative to the component carrier receptacle, counter to the lowering direction and in the lowering direction. For this purpose, the component carrier can be disposed in a vertical linear mounting at/in the component carrier receptacle of the build platform.

The component carrier can preferably allow setting in a position in which the surface thereof, on/above which a component can be produced, is located in the same plane as the surrounding surface of the component carrier receptacle of the build platform, and in at least one further position in which this surface of the component carrier is raised compared to the surrounding surface of the component carrier receptacle, in particular by a multiple n of the magnitude by which the build platform can be incrementally lowered, preferably such that n>0.5, and preferably such that n<10. The aforementioned multiple can, but does not have to be, an integer.

If the component carrier is only disposed so as to be raisable, and not rotatable, in the component carrier receptacle, the horizontal cross-section of the component carrier and of the recess in the component carrier receptacle is not limited in terms of the design, and can thus also be polygonal.

The invention can also provide that the component carrier is also disposed in a vertical linear mounting and a rotatable mounting at/in the component carrier receptacle of the build platform. While the method is being carried out, the component carrier can thus be rotated, in particular as needed, and/or be vertically raised, and also be lowered again, with respect to the component carrier receptacle.

In the embodiments comprising at least one component carrier, the overall build platform is preferably formed by a component carrier receptacle comprising at least one component carrier disposed therein or thereon, and, in particular, the respective recess assigned to the component carrier is disposed in the component carrier receptacle.

During a lowering movement for the purpose of applying powder, the component carrier and the component carrier receptacle are thus lowered simultaneously. The component carrier and the component carrier receptacle are thus oriented with respect to one another such that, in at least one possible position, the surfaces of the component carrier and of the surrounding component carrier receptacle of the build platform are situated so as to be aligned in the same plane. This position can form an original position for the component carrier. Preferably, it can be provided that a component carrier can only be raised with respect to the component carrier receptacle by a magnitude that is less than the height thereof in the raising direction. This prevents the powder from finding its way beneath a component carrier.

In these embodiments, the build platform may be understood as a design including a double bottom, which can be lowered in the overall, the bottoms of which can be moved relative to one another.

It is possible for more than only one component carrier to be provided at or in a build platform, and in particular at least two may be provided. Preferably, it is provided that these can be moved independently of one another. Likewise, it is possible for a drive for a movement direction to set multiple component carriers in motion simultaneously, and in particular to set all the component carriers in motion simultaneously. For this purpose, the component carriers can be kinematically coupled to one another.

When a rotation of the partially created component about a vertical axis is carried out, it is preferably provided that the rotation is carried out in a predetermined angular range about the vertical axis, wherein the angular range is, in particular, less than 360 degrees. The predetermined angular range can, for example, be given, or calculatable when data is available while the method is being carried out.

As mentioned at the outset, a contour elevation may arise at the partially created component during powder bed fusion.

The method can provide that, before the powder bed layer is created using an application doctor blade, a predetermined component region of the partially created component is rotated out of a direction facing the application doctor blade during the movement thereof, and in particular in a direction facing away from the application doctor blade.

It may be provided, for example, that a region that is produced in a manner conflicting with to the doctor blade movement on the partially created component, which is to say, in particular, facing the application doctor blade during the movement thereof, is rotated out of this direction. In this way, after rotation, the application doctor blade can pass over the contour elevation, even if contact is not prevented.

The invention can provide that possible positions of contour elevations can be calculated in advance based on the design data and/or the manufacturing parameters, such as, for example, the thermal conductivity of the powder bed and of the component, in particular for each layer to be produced. In this way, it is possible to establish, based on the calculated positions, whether the component is rotated, and if so, by what angle, before each powder bed layer is created. In this way, rotation can be performed after each layer is produced, or only after several predetermined layers have been produced, which is to say, preferably only after those that have at least one contour elevation directed in manner conflicting with to the application doctor blade.

In particular in conjunction with the rotation of the partially created component, but in principle also in conjunction with embodiments provided below, the invention can provide that a circular cylindrical wall is produced around the component to be manufactured in the powder bed, the center line of the wall coinciding with the axis of rotation, in particular when the component to be manufactured itself is not rotation-symmetrical. This wall is preferably created together with a component on the component carrier thereof, in particular at the radially outermost region of the component carrier.

This offers the advantage that the wall forms a barrier between a powder bed fraction that is rotated along with the partially created component, namely radially within the wall, and a powder bed fraction that is not rotated in the build container, namely radially outside the wall. The powder bed radially inside of the wall that directly surrounds the partially created component thus remains stationary relative thereto, making it possible to prevent rotation-induced powder compacting.

It may be provided that the wall is created across the entire height of the component to be manufactured. However, it is likewise possible to create the wall only across a lower partial height of the component.

The method according to the invention can preferably provide that at least one component is manufactured on the aforementioned component carrier of the build platform, and the partially created component is raised relative to the build platform, counter to the lowering direction, by way of the component carrier.

This makes it possible to raise the partially created component above the upper plane of the powder bed by vertically moving the component carrier with respect to the component carrier receptacle, and preferably also to lower this again, into or below this plane. Multiple objectives can thereby be pursued.

For example, it can be provided that the raising of the component carrier is carried out after a powder bed layer has been generated above the partially created component. As a result of this raising, the powder situated on the partially created component is then raised above the application level of the powder bed layer, and in particular above the height level of the surrounding powder bed outside the partially created component. Thereafter, a layer of the component is produced in this raised state.

The aforementioned raising can preferably also be combined with a vibratory movement. Such a vibratory movement can be carried out for a predetermined time interval, preferably after the raising, in particular with a vibration amplitude that is less than the magnitude by which the raising occurs, or corresponds thereto. Depending on the starting powder that is used and the properties thereof, such as flow behavior and agglomeration, such a vibration of the partially created component can easily displace slightly protruding powder regions out of the processing level.

Thus, after raising, only powder that rests on the raised partially created component, and in particular that rests thereon inside the outermost contour of the partially created component, is fused together with the layer of the partially created component situated therebeneath. Since the surrounding powder bed is lower in terms of the height, fewer, or preferably no, powder fractions are introduced into the outer edge regions of the melt in the component layer to be produced. The component roughness can thus be significantly reduced, at least at the outer surface region.

The invention can provide that, in particular in addition to the raising, but also as an alternative to the raising, powder is suctioned off by way of a suction device at a predetermined distance around the melted contour of the preceding layer, and in particular on the outside and/or inside of the contour of the cross-sectional surface, thus preferably on all possible sides of the contour, and in particular at least from the powder bed layer created immediately prior, and possibly also from powder bed layers created further prior thereto. In this way it can be provided that a trough-shaped powder bed depression results, preferably on all sides around the melted contour of the preceding component layer, into which, in particular, powder laterally adjoining the contour can flow. Only powder that is situated directly on the preceding melted cross-sectional surface thus remains for fusion.

The component roughness can thus also be reduced at surface regions other than the outer surface regions, and preferably at all surface regions.

Preferably in conjunction with the aforementioned raising prior to fusion, the invention can thus provide that the raising takes place by a magnitude that at least corresponds to 50% of the application thickness of the powder bed layer. Preferably, the raising can take place by at least 100%, more preferably by at least 500%, more preferably by at least 1000%, more preferably by at least 1500%, and more preferably by at least 2000% of the application thickness of the powder bed layer, and in particular raising by no more than 2500% may be provided.

Furthermore, it may be provided that at least one focus parameter, and in particular the focal position of the energy beam prior to fusion, is adapted to the raised position of the powder.

The invention can provide that the aforementioned raising is carried out for each layer to be produced, in particular with the exception of the first, or only for some of the total number of layers to be produced. In this way, it is also alternately possible for a certain number of layers to be carried out with the component carrier and the partially created component in the raised state, and for certain number of layers to be produced in the usual manner, directly after the powder bed layer has been created. The invention can provide that whether or not raising is carried out prior to the fusion for each layer is decided based on stored decision-making criteria, for example the surface quality required in the layer region. For example, there may be regions in a component to be manufactured in which a high surface quality is required, and other regions in which this is not the case.

It is provided that, after fusion with prior raising, the component carrier and the partially created component are lowered again, in particular into the previous position at which these were present before the raising, and the next powder bed layer is applied after the build platform has been lowered again.

The invention can provide that, in conjunction with raising prior to the fusion, or independently thereof, the component carrier and the partially created component are raised after a predetermined number N of layers of the component have been produced, for example these are raised by a magnitude that at least corresponds to the thickness of this predetermined number N of layers. This certain number N of layers can be carried out in the usual manner, without raising, and/or in the manner according to the invention, with raising prior to fusion. The number N can range between 1 and 20, for example. N can preferably be greater than 2, and more preferably greater than 5.

It may be provided, for example, that the magnitude to which the raising occurs, in this case, is selected to be N×M, wherein N is the predetermined number of layers, and M is a factor of greater than or equal to 1. M can be a real number. M is preferably selected as M>=1.5, and preferably M>=2.

It can likewise be provided that the magnitude to which the raising occurs is selected as a function of the focus diameter of the energy beam on the component surface to be treated. The magnitude of the raising is preferably selected so as to be at least 2 times greater, preferably at least 4 times greater, and more preferably at least 8 times greater than the focus diameter. The focus diameter shall preferably be understood to mean the diameter at the site of the focus, at which the intensity distribution of the energy beam, proceeding from the maximum, has dropped to $1/e^2$. As an alternative, it is also possible to use the full width at half maximum of the intensity distribution as the magnitude of the diameter.

Raising by the aforementioned magnitude preferably makes reference to the level of the surrounding powder bed. Thus, if the last layer of this predetermined number of layers was created in a raised position, the raising does not initially have to be reversed, but rather the existing raise can be increased by the predetermined number minus 1, and thereafter, in the overall, this will correspond to raising by the predetermined number above the surrounding powder bed.

The invention can provide that, after such raising, the regions of the partially created component which protrude beyond the level of the surrounding powder bed, and in particular the regions oriented outwardly from the partially created component, are then subjected to treatment.

Such treatment can, for example, be carried out by irradiation using an energy beam, and in particular the same as is used before during fusion, but it is also possible to use a different energy beam.

Preferably, surface smoothing can be achieved by way of the treatment. Likewise, one or more of the following treatments can be achieved: tempering, hardening, engraving, glazing, structuring, labeling, surface removal (ablation), cutting, drilling, and etching.

During treatment, it can preferably be provided that the energy beam carrying out the treatment is guided at a lower angle with respect to the powder bed surface than the energy beam bringing about the production of the layer. Since, the energy beam acts on lateral regions of the partially created component during the treatment, improved energy absorption is achieved.

Furthermore, the energy beam can have different beam parameters for the treatment than the energy beam that generates the layer, preferably in terms of wavelength and/or power and/or focus diameter and focal position. The beam source can thus preferably be different than that used during fusion.

More preferably, during treatment, the radiation source of the energy beam carrying out the treatment or the energy beam can be guided around the partially created component, or the partially created component can be rotated relative to the radiation source, or at least the energy beam thereof, in particular by way of the component carrier.

For all possible embodiments of the raising process, it may be provided that, after raising and before creating a new powder bed layer, the component carrier is lowered relative to the component carrier receptacle, in particular at least by the magnitude by which the preceding raising took place, and in particular into the original position.

Particularly preferably, rotation-symmetrical components and/or components that taper toward the top in the build direction can be manufactured using the method according to the invention.

A preferred embodiment will be described based on the drawing:

The drawing shows a device 1 for carrying out the method, in a lateral cross-sectional illustration. The device comprises a build container 2 including a build container wall 3. A build platform 4 is disposed in the build container 2 within the build container wall 3. This can be incrementally lowered downward in the vertical direction, in a known manner, by a schematically indicated drive 4d, during the production of a component 11, and in particular by a magnitude that corresponds to the application thickness of a powder bed layer.

In the embodiment shown here, the build platform 4 comprises a component carrier receptacle 4a, 4b made of two plates 4a and 4b located on top of one another. Here, the component carrier receptacle 4a, 4b includes at least one recess in the upper plate 4b in which a respective component carrier 4c is disposed. The respective component carrier 4c here can be both rotated about the vertical axis 4f, relative to the component carrier receptacle 4a, 4b, and raised counter to the lowering direction, and in particular can subsequently also be lowered again.

According to the invention, the component carrier receptacle 4a, 4b can also be formed of only a single plate-shaped element that can be lowered.

The design comprising two plates 4a, 4b offers two advantages.

On the one hand, this preferably allows the unit composed of the upper plate 4a and the component carrier 4c to be removed from the build container 3.

On the other hand, it will be possible to retrofit existing devices with only one lowerable build platform. In this way, a build platform 4 according to the invention can be formed of the elements 4a, 4b, 4c, using a build platform from the prior art, which would correspond to only the plate 4a here, and which is complemented by a plate 4b including recesses and at least one component carrier 4c disposed therein.

It is preferably provided that the component carriers 4c have a certain height so that, during movement, these do not extend so that the lower surface thereof is higher than the surface of the surrounding component carrier receptacle 4a, 4b. This prevents powder from finding its way beneath the component carriers 4c. In this example, the height is less than the thickness of the plate 4b, but this can also be configured differently, depending on the design. In particular, it is provided that component carriers 4c and the recess receiving the same are sealed with respect to one another so as to prevent powder from being introduced into the recess. This can be done, for example, by way of sealing elements acting between the recess and the component carrier, or by a clearance that prevents powder from being introduced.

In this embodiment, using drives 4e, each component carrier 4c can be both rotated about a vertical axis 4f and raised in the vertical direction, and can also be lowered again. It can also be provided that only the ability to rotated is implemented on at least one component carrier 4c, or that only the ability to be raised and lowered vertical is implemented on at least one component carrier 4c.

The drives 4e are shown beneath the build platform 4 here. In all possible embodiments of the invention, and in particular in embodiments that are not shown here, it is likewise possible for the drive of a respective component carrier, or the drive of all the component carriers, to be implemented within the vertical thickness of the build platform, and in particular of the component carrier receptacle thereof.

In each case, the movement of the component carriers 4c takes place relative to the component carrier receptacle 4a, 4b that is fixed in the current position. Preferably, this is only lowered downward in the vertical direction prior to the respective application of a powder bed layer. It can be provided that the build platform 4, with all the elements 4a, 4b, 4c thereof, is raised again only at the end of the production process.

A powder reservoir is disposed next to the build container 2. Here, the powder 7 can, alternatively, be disposed in a storage container 6a beneath an application doctor blade 8, from which powder 7 is raised to the working height of the application doctor blade 8, or in a storage container 6b above the application doctor blade 8, from which powder 7 is dropped in front of the application doctor blade 8.

The application doctor blade 8 can push the powder 7 that is present in front of the application doctor blade 8 across the build container 2 by movement following the arrow 9, so that a new powder bed layer results on top of/above the build platform 4, and the component carrier receptacle 4a, b implemented therewith, comprising component carriers 4c, in particular on an existing powder bed 10 and a partially created component 11 situated therein.

Excess powder 7 is collected in a collection container 5. Thereafter, the application doctor blade 8 moves back into the starting position thereof.

The application doctor blade 8 always operates at the same height level, so that the surface of a new powder bed layer, directly after having been created, is always situated in the same application plane 8a.

On the left, the drawing shows a component 11 that preferably tapers toward the top and that is produced above the left component carrier 4c. On the right, a component 11 is shown that is produced by way of support structures on the right component carrier 4c.

Both components 11 are shown in a position that is raised by the component carrier 4c, in which the powder 7a of the created powder bed layer, which is situated on the cross-sectional surface of the preceding component layer, is raised above the surrounding powder bed 10.

In contrast to the prior art, a layer is thus manufactured using powder 7a from the created powder bed layer, the powder being raised above the application plane 8a that is predefined by the application doctor blade 8. The component layer here is produced at a production level situated above the application level of the powder 7.

On the left component 11 it is shown that only the powder 7a situated on the raised, partially created component 11 is fused by way of the first energy beam 12 used for the fusion process, for example a laser beam, and this powder bonds to itself and to the layer of the component 11 located therebeneath.

The drawing illustrates that, as a result of the raising, the lateral edge regions 11a of the component 11, adjacent to the layer to be produced, are free of powder. As a result, it is no longer possible for powder adhesions to occur at this location, as they did in the prior art. An improved surface quality, and in particular lower roughness, compared to the prior art, is thereby directly achieved during the production of the layer.

It is likewise shown, for the left component 11, that the surface regions of the component 11, and in particular the surface regions 11a located laterally on the outside, that, due to the raising, protrude beyond the surrounding powder bed plane, and in particular beyond the application level 8a, can be treated with a further energy beam 13a. This preferably irradiates the component 11 at an angle that is lower, with respect to the powder bed surface, than the angle of the fusing energy beam 12. For the treatment, the energy source 13 generating the energy beam 13a, or only the beam 13a thereof, can be guided around the component 11, and alternatively or in combination therewith, the component 11 is rotated together with the component carrier 4c.

The drawing furthermore shows a suction device 14, here essentially the suction pipe thereof, by way of which powder 7 can be suctioned at least out of the powder bed layer applied last, and possibly also out of the older powder bed 10. The suctioning is preferably carried out close to the previously fused contour of the previously produced component layer. In this way, a trough 7b can be formed in the powder bed 10 close to the uppermost component cross-sectional surface, into which powder can flow down, and thus move away from the component 11. As a result of this, lateral powder adhesions can also be prevented during subsequent fusion.

The suctioning can be carried out in addition to raising, but also as an alternative thereto.

After raising and fusing, or after raising and treating the surface regions of a partially created component 11 exposed thereby, by lowering the component carrier 4c, in particular back into the original position thereof, the component is once again returned to a position in which the next application of a powder bed layer can be carried out after the overall build platform 4 has been lowered.

The rotatability of the component carriers 4c can also be utilized exclusively, or in combination with the aforementioned raising and lowering, so as to rotate excess contour elevations on the partially created component 11 into a position that is safe for the doctor blade movement, as described above.

The drawing furthermore shows the option of producing, in addition to a component 11, a circular cylindrical wall 15, by way of which, during rotation, the powder bed close to the component 11 can be decoupled from the surrounding powder bed.

The drawing also shows a variant embodiment in which the overall build platform 4 can be rotated about the axis 4g by way of the drive 4d. This embodiment can be provided in addition to those described above. However, the option of rotating the entire build platform 4 can also be provided in cases in which the component carrier receptacle 4a, 4b and the component carriers 4c are not implemented at the build platform 4. Although this eliminates the ability for raising, the advantages associated with rotation can nonetheless be made possible.

Figure 2B:
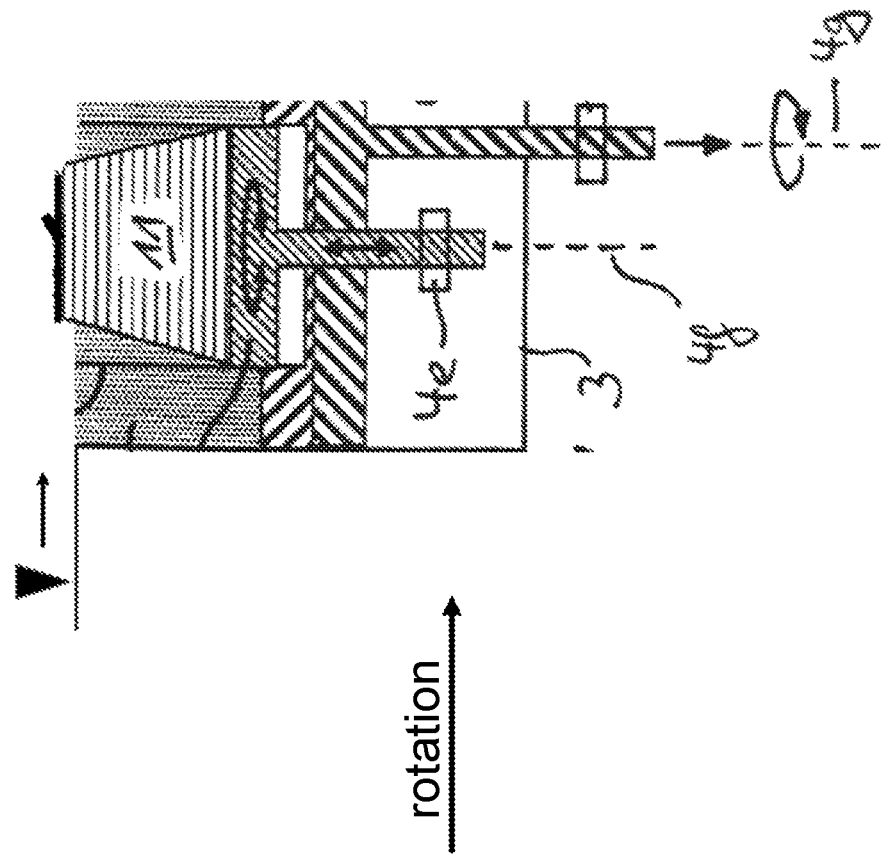
Figure 2A:
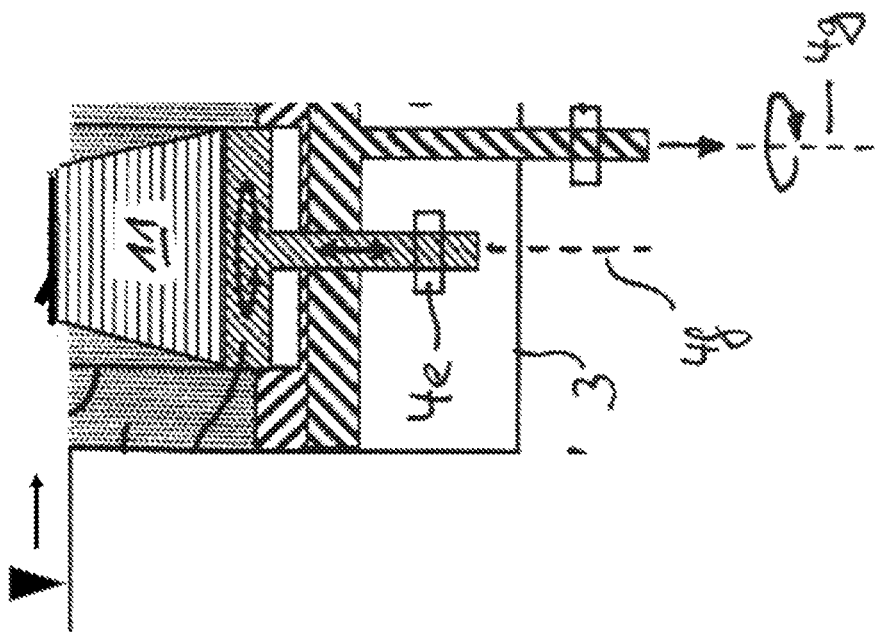

FIGS. 2A and 2B include schematic, 2-dimensional representations of a contour elevation E which (a) faces the application doctor blade 8 (FIG. 2A) so that the application doctor blade 8 would collide with the contour elevation E and (b) subsequent rotation (FIG. 2B) sufficient to cause the contour elevation E to face away from the application doctor blade 8 (FIG. 2B) so that the application doctor blade 8 would pass over the contour elevation E even if the application doctor blade 8 would contact the contour elevation E.

The invention claimed is:

1. A method for additive layer manufacturing of at least one component, comprising, in a recurring manner,
   a. generating a powder bed layer made of a fusible powder material above a build platform of a build container,
   b. fusing the powder material of the powder bed layer thereby to partially create the at least one component in a form of a layer of the component by application of an energy beam onto a cross-sectional surface representing the at least one component in the layer being fused, the powder material in the layer being fused bonding to itself and to layers present beneath the layer being fused,
   c. lowering the build platform in the build container after producing each fused layer, and
   d. moving the at least one partially created component multiple times in a direction different from a direction of the lowering of the build platform,
   wherein the moving of the at least one partially created component in a direction different from the direction of lowering of the build platform comprises raising the at least one component carrier, relative to the component carrier receptacle, counter to the lowering direction of the build platform, and the raising is carried out after a respective powder bed layer having a surface defining a powder bed application level has been generated in the build container including respective portions thereof atop each of the at least one partially created component and a portion thereof remaining at the application level, whereby the powder situated on each of the at least one partially created component is raised above the powder bed layer remaining at the application level, and, in the step of fusing the powder material, a layer of each of the at least one component is manufactured in the raised position from the respective powder bed layer atop each of the at least one partially created component by applying the energy beam only to the respective powder bed layer atop each of the at least one partially created component.

2. The method according to claim 1, further comprising rotating the at least one partially created component in a predetermined angular range about a vertical axis that is parallel to the lowering direction by rotating the entire build platform or the entire build container.

3. The method according to claim 2, wherein the generation of the powder bed layer comprises using an application doctor blade, and, wherein at least one partially created component has a contour elevation facing the doctor blade so that it would collide therewith, and the rotating the at least one partially created component having the contour elevation in a predetermined angular range about a vertical axis that is parallel to the lowering direction by rotating the entire build platform or the entire build container is effected before the powder bed layer is generated, and the predetermining of the angular range of the rotating of the at least one partially created component having the contour elevation comprises selecting an angular range sufficient to rotate the contour elevation so that the contour elevation faces away from the application doctor blade and would allow the application doctor blade to pass over the contour elevation even if the application doctor blade would contact the contour elevation.

4. The method according to claim 3, wherein the at least one component is manufactured on at least one component carrier of the build platform and the at least one partially created component is rotated by rotating each of the at least one component carrier, relative to a component carrier receptacle of the build platform, about a respective vertical axis that is parallel to the lowering direction.

5. The method according to claim 1, wherein the at least one component is manufactured on at least one component carrier of the build platform and the at least one partially created component is rotated by rotating each of the at least one component carrier, relative to a component carrier receptacle of the build platform, about a respective vertical axis that is parallel to the lowering direction.

6. The method according to claim 1, wherein each of the at least one component to be manufactured is not rotation-symmetrical and the method further comprises producing a respective circular cylindrical wall around each of the at least one component to be manufactured in the powder bed, a respective center line of each of the walls coinciding with the axis of rotation.

7. The method according to claim 1, wherein the raising takes place by a magnitude that corresponds to at least 50% of an application thickness of the powder bed layer.

8. The method according to claim 1, wherein the raising is carried out after a predetermined number N of layers of the at least one component have been manufactured, the raising being by a magnitude that is at least equal to an overall thickness of the N layers.

9. The method according to claim 1, further comprising, after the raising, subjecting regions of the partially created component which point outwardly from the partially created component irradiation with an energy beam thereby to effect surface smoothing.

10. The method according to claim 9, wherein the energy beam carrying out the surface smoothing is guided at a lower angle with respect to a surface being smoothed thereby than an angle of the energy beam relative to a surface of a respective powder bed layer onto which the energy is being applied to produce a respective layer of the at least one component, and the two energy beams have different beam parameters in terms of wavelength and/or power and/or focus diameter and/or focal position.

11. The method according to claim 9, wherein, during the surface smoothing, the energy beam or a radiation source of the energy beam carrying out the surface smoothing is guided around the at least one partially created component, or the at least one partially created component is rotated relative to the energy beam carrying out the surface smoothing by rotating the at least one component carrier.

12. The method according to claim 1, wherein, after the raising of the at least one component carrier and before generating a new powder bed layer, the at least one component carrier is lowered relative to the component carrier receptacle at least by a magnitude by which the preceding raising took place.

13. A method for additive layer manufacturing of at least one component, comprising, in a recurring manner,
   a. generating a powder bed layer made of a fusible powder material above a build platform of a build container,
   b. fusing the powder material of the powder bed layer thereby to partially create the at least one component in a form of a layer of the component by application of an energy beam onto a cross-sectional surface representing the at least one component in the layer being fused, the powder material in the layer being fused bonding to itself and to layers present beneath the layer being fused,
   c. lowering the build platform in the build container after producing each fused layer, and
   d. moving the at least one partially created component multiple times in a direction different from a direction of the lowering of the build platform, and
      further comprising rotating the at least one partially created component in a predetermined angular range about a vertical axis that is parallel to the lowering direction by rotating the entire build platform or the entire build container,
   wherein the generation of the powder bed layer comprises using an application doctor blade, and wherein at least one partially created component has a contour elevation facing the doctor blade so that it would collide therewith, and the rotating the at least one partially created component having the contour elevation in a predetermined angular range about a vertical axis that is parallel to the lowering direction by rotating the entire build platform or the entire build container is effected before the powder bed layer is generated, and the predetermining of the angular range of the rotating of the at least one partially created component having the contour elevation comprises selecting an angular range sufficient to rotate the contour elevation so that the contour elevation faces away from the application doctor blade and would allow the application doctor blade to pass over the contour elevation even if the application doctor blade would contact the contour elevation.

14. A method for the additive layer manufacturing of at least one component according to claim 13, wherein, prior to fusing the powder of the generated powder bed layer, suctioning off powder that is situated laterally next to a contour of the preceding component layer such that powder from the powder bed layer which is situated on a cross-sectional surface of the preceding component layer is separated from surrounding powder bed by a powder bed depression.

\* \* \* \* \*